US007961152B2

(12) United States Patent
Cheng et al.

(10) Patent No.: US 7,961,152 B2
(45) Date of Patent: Jun. 14, 2011

(54) ELECTRONIC DEVICE HAVING HELICAL RESILIENT MEMBER SERVING AS ELECTRIC INDUCTANCE ELEMENT

(75) Inventors: Yu-Chiang Cheng, Taipei (TW); Ping-Cheng Chang, Pingtung County (TW); Cheng-Zing Chou, Xinying (TW)

(73) Assignee: Getac Technology Corporation, Hsinchu (TW)

( * ) Notice: Subject to any disclaimer, the term of this patent is extended or adjusted under 35 U.S.C. 154(b) by 1254 days.

(21) Appl. No.: 11/584,616

(22) Filed: Oct. 23, 2006

(65) Prior Publication Data

US 2007/0236317 A1 Oct. 11, 2007

(30) Foreign Application Priority Data

Apr. 7, 2006 (TW) .............................. 95112536 A

(51) Int. Cl.
*H01Q 9/00* (2006.01)

(52) U.S. Cl. ....................................... 343/749; 336/177

(58) Field of Classification Search .................... 336/77, 336/177; 343/749, 722, 745, 860
See application file for complete search history.

(56) References Cited

U.S. PATENT DOCUMENTS

| | | | |
|---|---|---|---|
| 5,606,730 A | 2/1997 | Rush et al. | |
| 6,177,908 B1 | 1/2001 | Kawahata et al. | |
| 6,239,753 B1 | 5/2001 | Kado et al. | |
| 6,687,518 B1 | 2/2004 | Park | |
| 6,980,156 B2 * | 12/2005 | Komiyama | 343/702 |
| 7,226,293 B2 * | 6/2007 | Na et al. | 439/66 |

FOREIGN PATENT DOCUMENTS

| | | |
|---|---|---|
| CN | 1116471 | 2/1996 |
| DE | 19713929 | 11/1997 |
| DE | 199119383 | 11/1999 |
| DE | 102005015710 | 6/2006 |
| JP | 10-262105 | 9/1998 |
| TW | 565760 B | * 11/2003 |
| TW | 565760 | 12/2003 |

OTHER PUBLICATIONS

Communication from the German Patent Office dated Oct. 21, 2009 with regard to the counterpart German Application 102007016820.
Communication from the Chinese Patent Office dated Aug. 7, 2009 with regard to the counterpart Chinese Application 2007101056381.

* cited by examiner

*Primary Examiner* — Jacob Y Choi
*Assistant Examiner* — Kyana R Robinson

(57) ABSTRACT

An electronic device includes a helical resilient member serving as an electrical inductance element. The electronic device also includes an antenna, a signal feeding line, and a transmitting/receiving module. The helical resilient member has first and second ends with a predetermined number of turns of coil arranged therebetween the first and second ends, and is made of electrically conductive materials so that the turns of coil defines an electrical inductance. The signal feeding line is connected between the helical resilient member and a signal feed point of the antenna. The transmitting/receiving module is connected to the helical resilient member so as to couple the inductance of the helical resilient member to the transmitting/receiving module.

9 Claims, 4 Drawing Sheets

ELECTRONIC DEVICE HAVING HELICAL RESILIENT MEMBER SERVING AS ELECTRIC INDUCTANCE ELEMENT

FIELD OF THE INVENTION

The present invention relates to an electric inductance element, and in particular to an electronic device that uses a helical resilient member to serve as an electric inductance element.

BACKGROUND OF THE INVENTION

An electronic device, such as a notebook computer and a personal digital assistant, is often provided with various mechanical elements to achieve various mechanical functions that are desired to facilitate the operation and use of the electronic device. For example, resilient elements, such springs and reeds, are often used in the design of mechanism for electronic devices. Taiwan Patent Publication No. 00565760 teaches a bi-directional latching device for notebook computers, which comprises a bi-directional unit, composed of a driving section and a latching section. The driving section comprises an operation knob exposed outside an enclosure of a liquid crystal display of a notebook computer, and first and second pressing pieces connected to the operation knob. One side of the driving section engages a first resilient member arranged inside the enclosure of the liquid crystal display of the notebook computer. The latching section has a first slot corresponding to the first pressing piece, a connection member arranged at one side corresponding to the second pressing piece, a depressing piece attached to the connection member, and at least a latch exposed outside the enclosure of the liquid crystal display of the notebook computer. The latching section is connected to a second resilient member arranged inside the enclosure of the liquid crystal display of the notebook computer. A receiving section is formed in a casing of the notebook computer for engaging the latch when the enclosure of the liquid crystal display is closed on the casing of the notebook computer. The bi-directional latching device allows a user to operate in a dexterous or sinistral manner.

The conventional device discussed above allows a user to operate the knob in a dexterous manner or a sinistral manner, but the resilient members used therein are only for providing a biasing or returning force for opening or closing the notebook computer.

On the other hand, some of the electronic devices are equipped with additional electronics, such as an antenna for transmitting/receiving electromagnetic waves. The additional electronics requires additional costs. Further, a space must be provided in the electronic device for accommodating the additional electronics. Both factors are against the current trend of low cost and compactness for electronic devices, such as notebook computers. This is a challenging issue for the manufacturers of the electronic devices in question.

Apparently, the cost and overall side of the electronic device can be substantially reduced if the resilient members that are used for providing a biasing force in the electronic device may provide a further function that was originally effected by the additional electronics that requires additional costs and space.

SUMMARY OF THE INVENTION

Thus, an objective of the present invention is to provide a helical resilient member that serves as both a mechanical element and an electronic element so that the helical resilient member can cooperate with a latch mechanism to selectively open/close an electronic device in which the helical resilient member is used and can be connected to a circuit module to serve as an electrical inductor for the circuit.

Another objective of the present invention is to provide a helical resilient member that serves as an electrical inductor for a circuit, wherein the helical resilient member forms an LC resonance circuit with an electrical capacitor for tuning the output power and frequency for a wireless signal transmitting/receiving module.

A further objective of the present invention is to provide a helical resilient member that also serves as an antenna so that when the helical resilient member is coupled to a wireless signal transmitting/receiving module, the helical resilient member can effect as an antenna for transmitting/receiving wireless signals.

To achieve the above-mentioned objectives, in accordance with the present invention, an electronic device that uses a helical resilient member as an inductance element is provided. The electronic device comprises a helical resilient member, an antenna, a signal feeding line, and a wireless signal transmitting/receiving module. The helical resilient member has first and second ends with a predetermined number of turns of coil arranged there between the first and second ends, and is made of electrically conductive materials so that the turns of coil defines an electrical inductance. The antenna has a signal feed point. The signal feeding line is connected between the first end of the helical resilient member and the signal feed point of the antenna. The wireless signal transmitting/receiving module is connected to the helical resilient member so as to couple the inductance of the helical resilient member to the wireless signal transmitting/receiving module.

When the helical resilient member serves as an electrical inductor for a circuit module, the helical resilient member is preferably coupled to an electrical capacitor of the circuit module to form an LC resonance circuit.

Alternatively, the electronic device comprises a helical resilient member and a wireless signal transmitting/receiving module. The helical resilient member has a first end and a second end, and is made of an electrically conductive material. The wireless signal transmitting/receiving module has a first signal connection terminal that is connected to the second end of the helical resilient member so that the helical resilient member serves as an antenna for transmitting/receiving wireless signals of a predetermined band.

Apparently, as compared to the conventional devices, the present invention improves the usefulness of the helical resilient member. In the present invention, the helical resilient member is employed to cooperate with a latch mechanism for opening/closing an electronic device, such as a notebook computer, and is also used as an electrical inductor or alternatively, an antenna, whereby the helical resilient member features both a mechanical element and an electric element and thus the utilization thereof is fully exploited. With such an arrangement, costs of the electronic devices are reduced and available space inside the electronic device is increased for more effective use.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
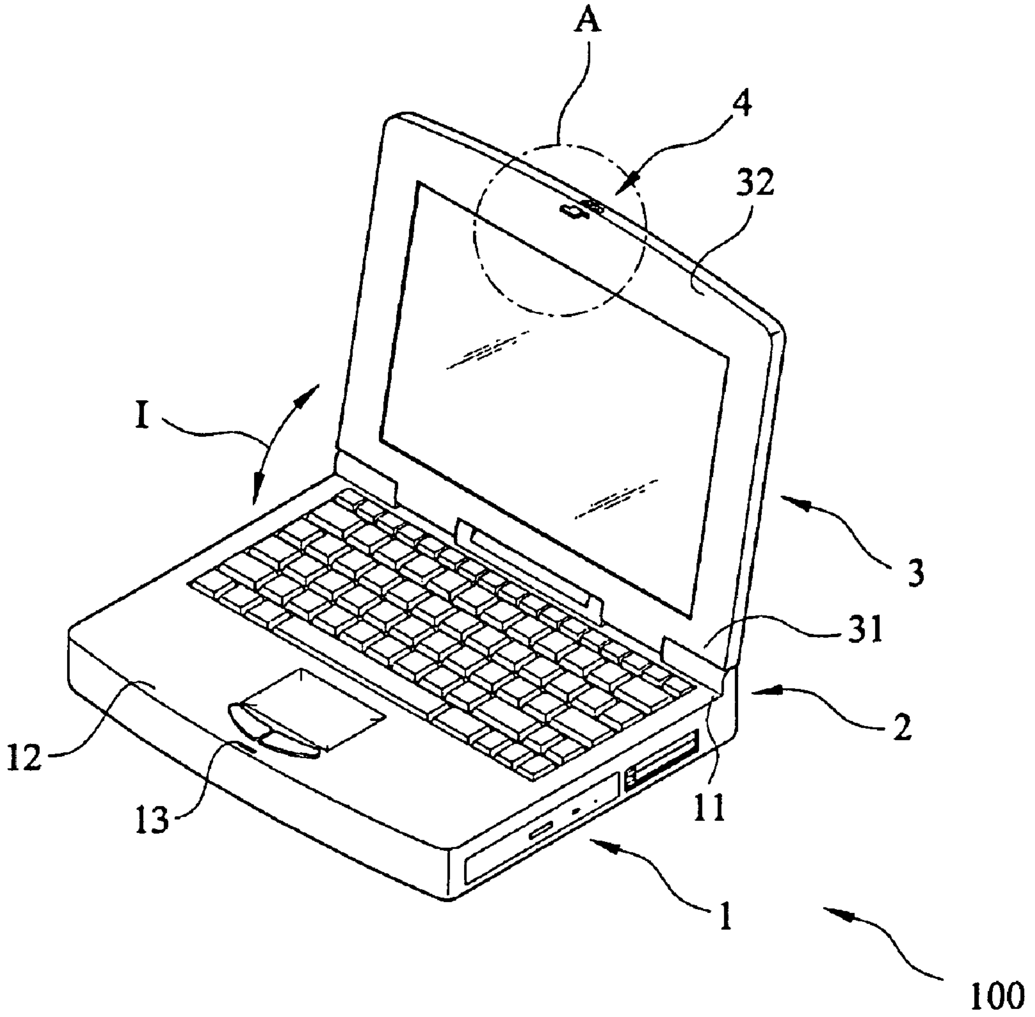
FIG. 1 is a perspective view of an electronic device constructed in accordance with the present invention.
Figure 2:
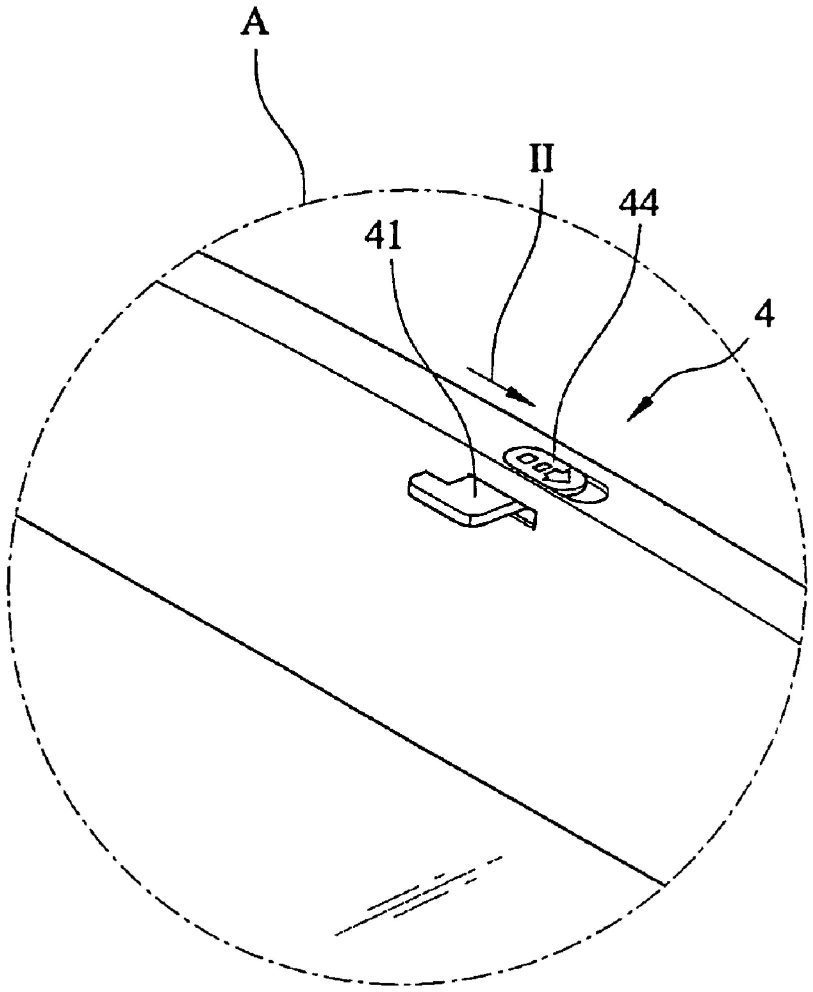
FIG. 2 is an expanded view of the encircled portion designated A in FIG. 1.
Figure 3:
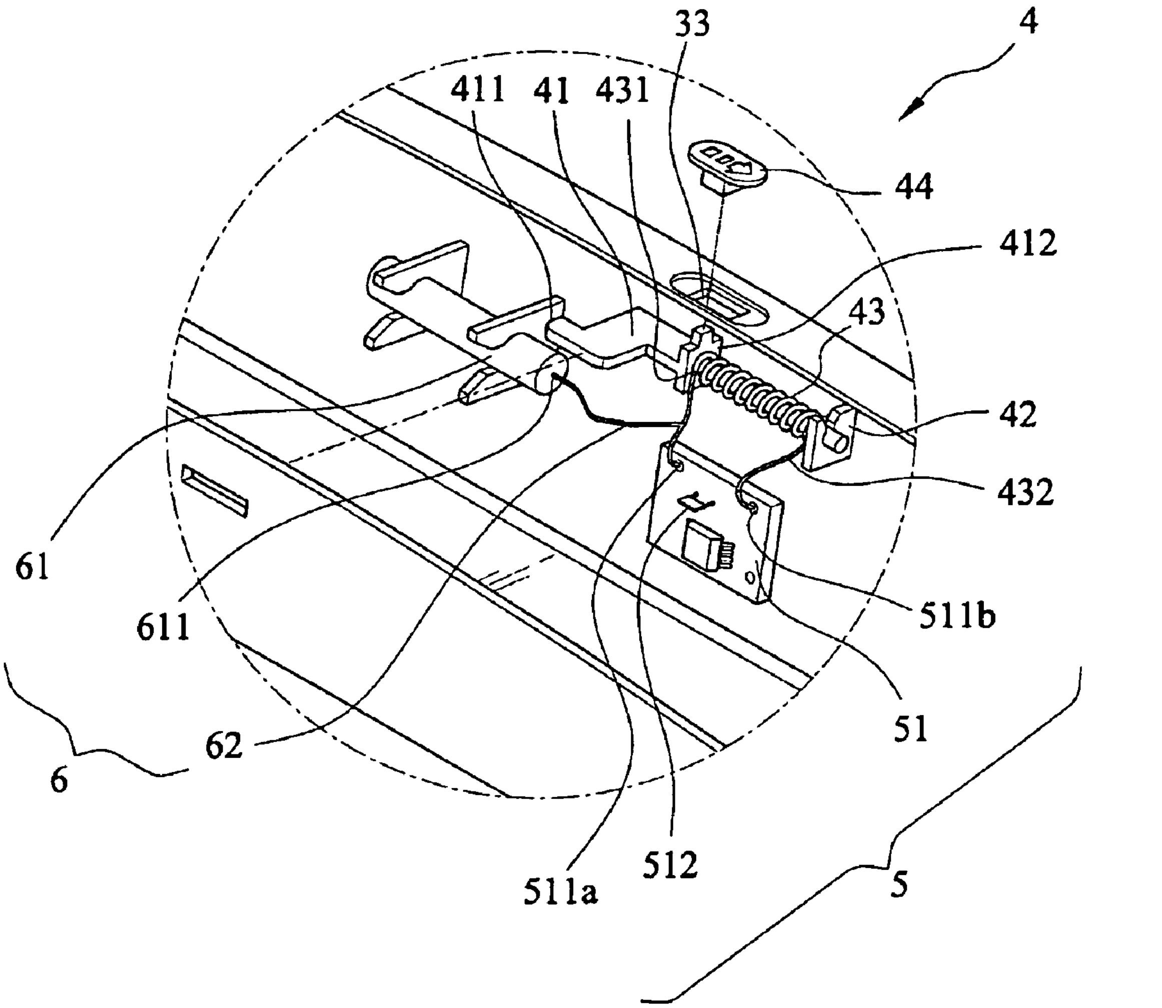
FIG. 3 is an exploded view of FIG. 2.

With reference to the drawings and in particular to FIGS. 1-3, of which FIG. 1 is a perspective view of an electronic device constructed in accordance with an embodiment of the present invention, FIG. 2 is an expanded view of the encircled portion designated A in FIG. 1, and FIG. 3 is an exploded view of FIG. 2, the electronic device constructed in accordance with the present invention, generally designated with reference numeral 100, comprises a base portion 1, a hinge mechanism 2, a cover portion 3, and a latch mechanism 4. The base portion 1 has a first edge 11 and an opposite second edge 12.

A locking slot 13 is defined in a surface of the base portion 1 at a location close to the second edge 12. The hinge mechanism 2 is arranged at the first edge 11 of the base portion 1. The cover portion 3 has a coupling edge 31 that is rotatably coupled to the first edge 11 of the base portion 1 by the hinge mechanism 2. Besides the coupling edge 31, the cover portion 3 has a latching edge 32 as well, and defines a hole 33. The cover portion 3 is rotatable around the hinge mechanism 2 with respect to the base portion 1 along a direction indicated by arrow I to move away from the base portion 1 for opening or approach to the base portion 1 for closing.

The latch mechanism 4 is arranged at the latching edge 32 of the cover portion 3 and comprises a movable latch plate 41 and a positioning plate 42 that maintains the latch plate 41 at a predetermined position, a helical resilient member 43, and a movable operation knob 44. The latch plate 41 has a locking tab 411 and a pressing tab 412. The helical resilient member 43 has first and second ends 431, 432, and a predetermined number of turns of coils arranged between the ends 431, 432. The helical resilient member 43 is fit over and thus encompasses a portion of the 41 with the first and second ends thereof abutting against the pressing tab 412 of the latch plate 41 and the positioning plate 42, respectively. The helical resilient member 43 is made of an electrically conductive material and is constructed so that the number of the turns of coil of the helical resilient member 43 defines a desired electrical inductance value. The operation knob 44 is located outside the cover portion 3 for user's access and partially extends into the cover portion 3 through the hole 33, which is elongate in a direction of movement of the operation knob 44, to attach to the latch plate 41, such as the pressing tab 412. Thus, moving the operation knob 44 along the hole 33, the latch plate 42 is thus driven by the pressing tab 412 that is connected to the knob 44 to move in a direction indicated by arrow II with a controlled stroke.

Those skilled in the art may know that when the cover portion 3 is closed on the base portion 1, the locking tab 411 of the latch plate 41 is engageable with the locking slot 13. The helical resilient member 43 provides a biasing force to the locking tab 411 to have the locking tab 411 securely engage the locking slot 13 of the base portion 1. To detach the cover portion 1 from the base portion 1 for opening the cover portion 1, the operation knob 44 is moved in the direction II against the biasing force of the helical resilient member 43 to a predetermined position so as to disengage the locking tab 411 of the latch plate 41 from the locking slot 13 of the base portion 1. At this moment, the helical resilient member 43 is depressed against the positioning plate 42 by the pressing tab 412 of the latch plate 41 and the cover portion 3 is allowed to move away from the base portion 1.

The electronic device 100 is also provided with a circuit module 5, which is arranged inside the cover portion 3 and has at least one signal connection terminal. In the embodiment illustrated, the circuit module 5 comprises a wireless signal transmitting/receiving module 51, which has a first signal connection terminal 511*a*, a second signal connection terminal 511*b*, and a capacitor 512. The first and second signal connection terminals 511*a*, 511*b* are respectively and electrically coupled to two terminals of the capacitor 512, and are also respectively connected to the first and second ends 431, 432 of the helical resilient member 43 so as to couple the inductance of the helical resilient member 43 to the wireless signal transmitting/receiving module 51. Further, the capacitor 512 is electrically connected to the helical resilient member 43, whereby the capacitor 512 and the helical resilient member 43 both constitute an LC resonance circuit.

The wireless signal transmitting/receiving module 51 is provided with an antenna module 6, which comprises a wireless signal transmitting/receiving antenna 61 and a signal feeding line 62. The antenna 61 functions to transmit and/or receive a wireless signal of a predetermined band and has a signal feed point 611. The signal feeding line 62 is connected to the first end 431 of the helical resilient member 43 and the signal feed point 611 of the antenna 61.

It is apparent to those having ordinary skills of the art that the wireless signal transmitting/receiving module 51 may process a wireless signal that is received/transmitted by the antenna module 6. Thus, the wireless signal generated by the wireless signal transmitting/receiving module 51 can be conveyed by the signal feeding line 62 of the corresponding frequency of transmission/receipt through the signal feed point 611 to the wireless signal transmitting/receiving antenna 61, by which the signal is transmitted.

The helical resilient member 43 and the capacitor 512 form an LC resonance circuit so that when the wireless signal transmitting/receiving module 51 is transmitting power, the output power thereof can be completely transferred to the wireless signal transmitting/receiving antenna 61. This makes the wireless signal transmitting/receiving antenna 61 completely mating the output power of the wireless signal transmitting/receiving module 51, namely one half of the wavelength of a designated frequency. Thus, when the wireless signal transmitting/receiving antenna 61 receives signals of the designated frequency, the wireless signal transmitting/receiving module 51 may have the best performance of signal receipt for the designated frequency.

Figure 4:
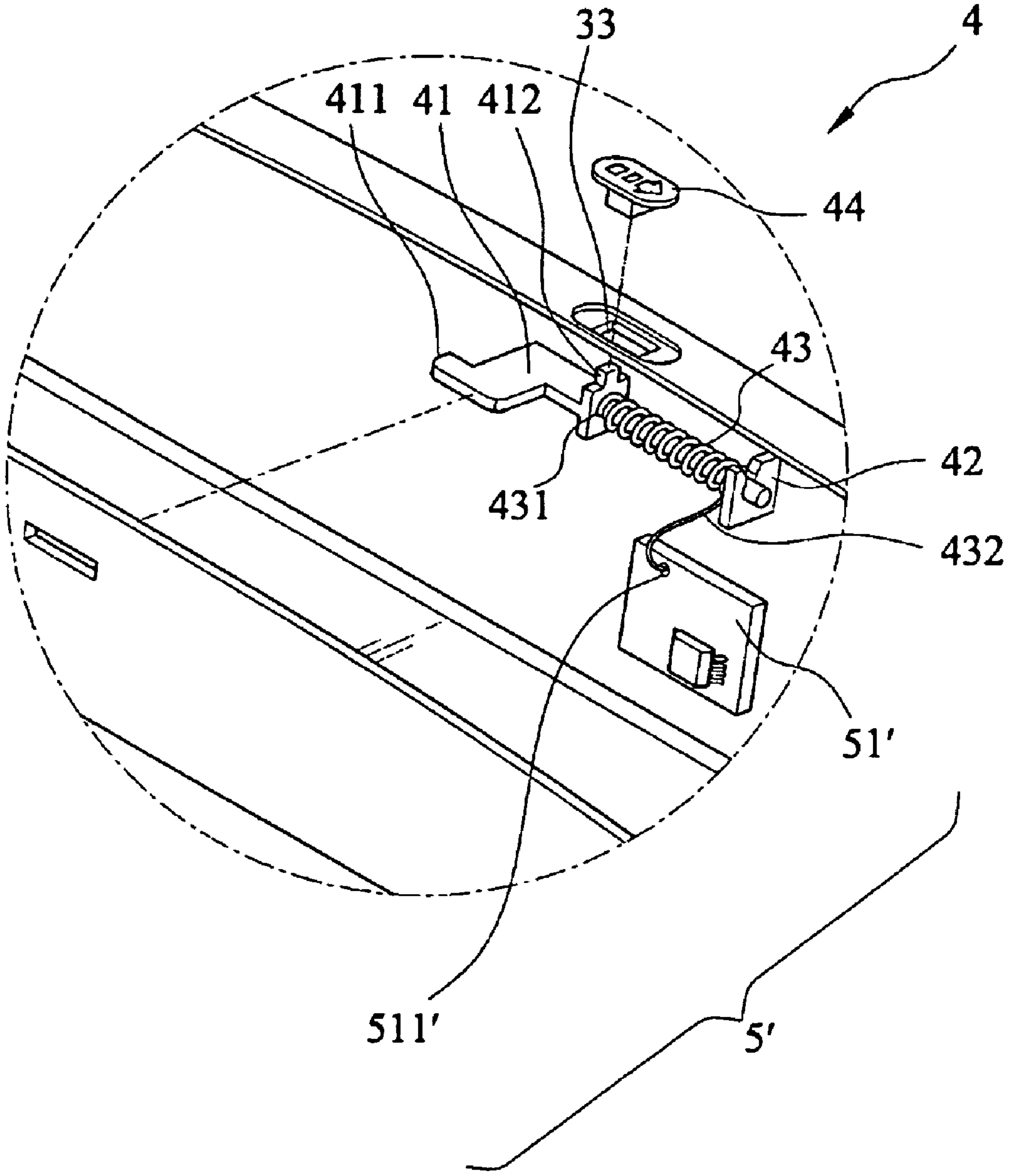
FIG. 4 is an exploded view of a portion of an electronic device constructed in accordance with another embodiment of the present invention.

FIG. 4 shows an exploded view of a portion of an electronic device constructed in accordance with another embodiment of the present invention, comprising a circuit module 5', and a wireless signal transmitting/receiving module 51' which has a first signal connection terminal 511', which replace the circuit module 5, and the wireless signal transmitting/receiving module 51 comprising the first signal connection terminal 511*a* of the electronic device of the previous embodiment illustrated in FIG. 3. The second end 432 of the helical resilient member 43 is connected to the first signal connection terminal 511' of the wireless signal transmitting/receiving module 51' so that the helical resilient member 43 serves as an antenna to replace the wireless signal transmitting/receiving antenna 61 of the electronic device of the previous embodiment illustrated in FIG. 3, and to perform transmission and/or receipt of a wireless signal of a predetermined band.

It is apparent to those having ordinary skills of the art that the helical resilient member 43 can be further coupled to a further antenna so that the helical resilient member 43 may serve as a tuning element for the antenna whereby the antenna can effectively receive signals of one half wavelengths at designated frequency with reduced length. Further, the helical resilient member 43 can be a spring or an equivalent element comprising resilient biasing and returning force.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An electronic device comprising:

a helical resilient member arranged inside the electronic device, comprising a first end, a second end, and a predetermined number of turns of coil arranged between the first and second ends, the helical resilient member being made of an electrically conductive material, the predetermined number of turns of coil defining an electrical inductance;

a wireless signal transmitting/receiving antenna provided for transmitting/receiving a wireless signal of a selected band, the wireless signal transmitting/receiving antenna comprising a signal feed point;

a signal feeding line connected between the first end of the helical resilient member and the signal feed point of the wireless transmitting/receiving antenna;

a wireless signal transmitting/receiving module comprising a first signal connection terminal and a second signal connection terminal, which are connected to the first and second ends of the helical resilient member so as to couple the inductance of the helical resilient member to the wireless signal transmitting/receiving module;

a base portion comprising first and second edges, a locking slot being formed in a surface of the base portion at a location close to the second edge;

a hinge mechanism arranged at the first edge of the base portion;

an openable cover portion comprising a coupling edge and a latching edge, the coupling edge being connected to the first edge of the base portion by the hinge mechanism so that the cover portion is rotatable about the hinge mechanism with respect to the base portion for opening/closing the cover portion; and a latch mechanism arranged at the latching edge of the cover portion, comprising a movable latch plate, and at least one positioning plate for maintaining the latch plate at a predetermined position whereby when the cover portion is closed on the base portion, arranged such that the latch plate engages the locking slot defined in the base portion and the engagement between the latch plate and the locking slot is secured by a biasing force applied to the latch plate by the helical resilient member.

2. The electronic device as claimed in claim 1, wherein the helical resilient member is connected to an electrical capacitor in such a way that the capacitor and the helical resilient member together form an LC resonance circuit.

3. The electronic device as claimed in claim 1, wherein the helical resilient member is fit over and thus encompasses at least a portion of the latch plate.

4. The electronic device as claimed in claim 1, wherein the latch mechanism further comprises an operation knob that is attached to the latch plate whereby the operation knob moves the latch plate in a selected direction.

5. An electronic device comprising:

a helical resilient member arranged inside the electronic device, comprising a first end, a second end, and a predetermined number of turns of coil arranged between the first and second ends, the helical resilient member being made of an electrically conductive material, the predetermined number of turns of coil defining an electrical inductance;

a circuit module comprising a signal connection terminal connected to the second end of the helical resilient member to couple the inductance of the helical resilient member to the circuit module;

a base portion comprising first and second edges, a locking slot being formed in a surface of the base portion at a location close to the second edge;

a hinge mechanism arranged at the first edge of the base portion;

an openable cover portion comprising a coupling edge and a latching edge, the coupling edge being connected to the first edge of the base portion by the hinge mechanism so that the cover portion is rotatable about the hinge mechanism with respect to the base portion for opening/closing the cover portion; and a latch mechanism arranged at the latching edge of the cover portion, comprising a movable latch plate, and at least one positioning plate for maintaining the latch plate at a predetermined position whereby when the cover portion is closed on the base portion, arranged such that the latch plate engages the locking slot defined in the base portion and the engagement between the latch plate and the locking slot is secured by a biasing force applied to the latch plate by the helical resilient member.

6. The electronic device as claimed in claim 5, wherein the circuit module comprises a wireless signal transmitting/receiving module comprising a first signal connection terminal and a second signal connection terminal, which are connected to the first and second ends of the helical resilient member so as to couple the inductance of the helical resilient member to the wireless signal transmitting/receiving module.

7. The electronic device as claimed in claim 5, wherein the helical resilient member is fit over and thus encompasses at least a portion of the latch plate.

8. The electronic device as claimed in claim 5, wherein the latch mechanism comprises an operation knob that is attached to the latch plate whereby the operation knob moves the latch plate in a selected direction.

9. An electronic device comprising:

a base portion;

a cover portion rotatably connected to the base portion by a hinge mechanism;

a latch mechanism arranged to engage the cover portion to the base portion, the latch mechanism including a helical resilient member providing a biasing force to engage the latch mechanism;

a wireless signal transmitting/receiving module comprising a first signal connection terminal and a second signal connection terminal;

a wireless signal transmitting/receiving antenna provided for transmitting/receiving a wireless signal of a selected band, the wireless signal transmitting/receiving antenna comprising a signal feed point; and a signal feeding line connected between the first end of the helical resilient member and the signal feed point of the wireless transmitting/receiving antenna;

wherein the helical resilient member comprises a first end, a second end, and a predetermined number of turns of coil arranged between the first and second ends, the helical resilient member being made of an electrically conductive material, and wherein the first signal connection terminal and the second signal connection terminal are connected to the first and second ends of the helical resilient member; and wherein the predetermined number of turns of coil of the helical resilient member define an electrical inductance, and wherein the first signal connection terminal and the second signal connection terminal are connected to the first and second ends of the helical resilient member so as to couple the inductance of the helical resilient member to the wireless signal transmitting/receiving module.

* * * * *